J. M. CHAPPEL.
WEIGHING MACHINE.
APPLICATION FILED JULY 29, 1909.
970,465.
Patented Sept. 20, 1910.
3 SHEETS—SHEET 1.
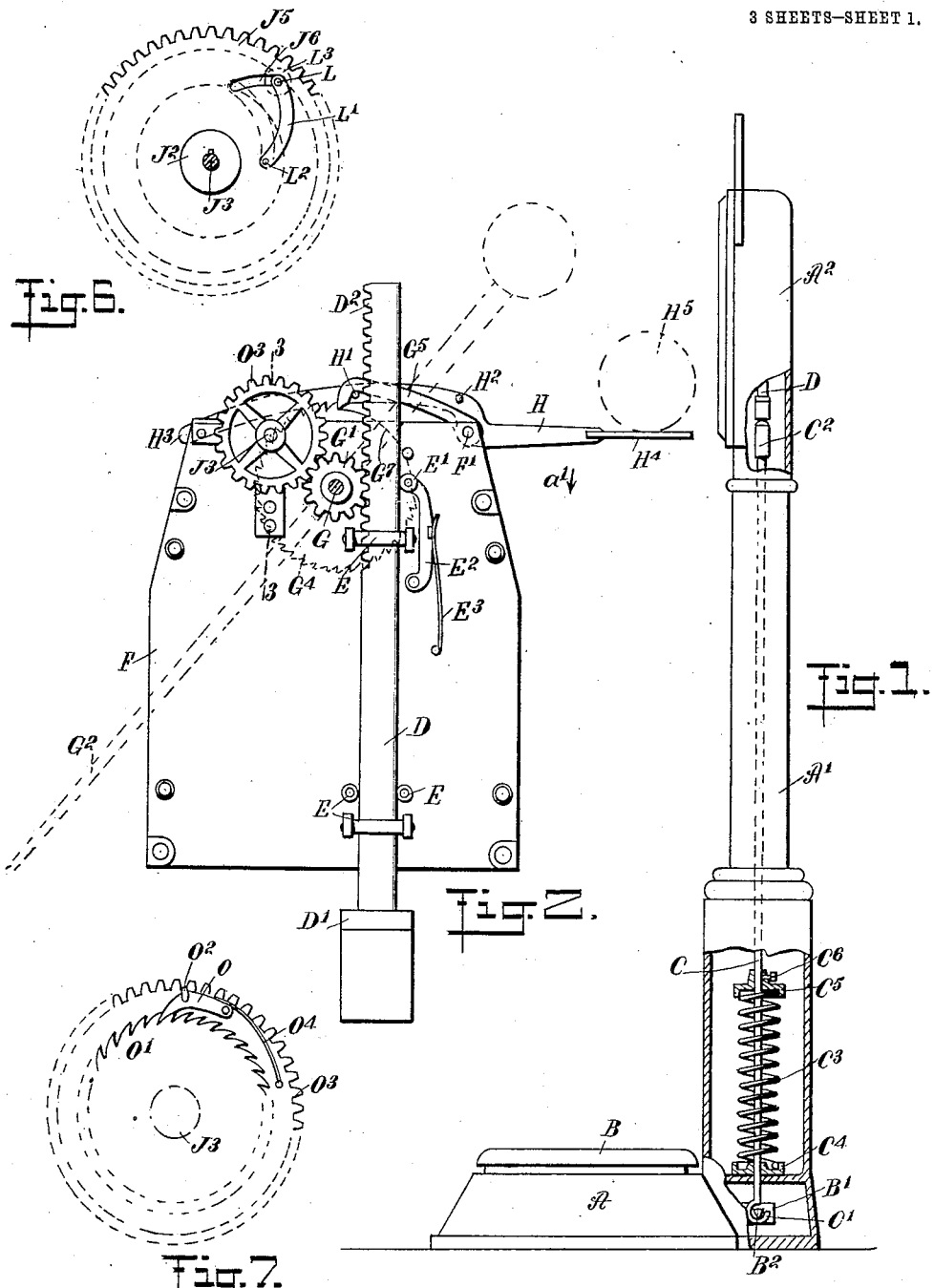
INVENTOR
James M. Chappel J. M. CHAPPEL.
WEIGHING MACHINE.
APPLICATION FILED JULY 29, 1909.
970,465.
Patented Sept. 20, 1910.
3 SHEETS—SHEET 2.
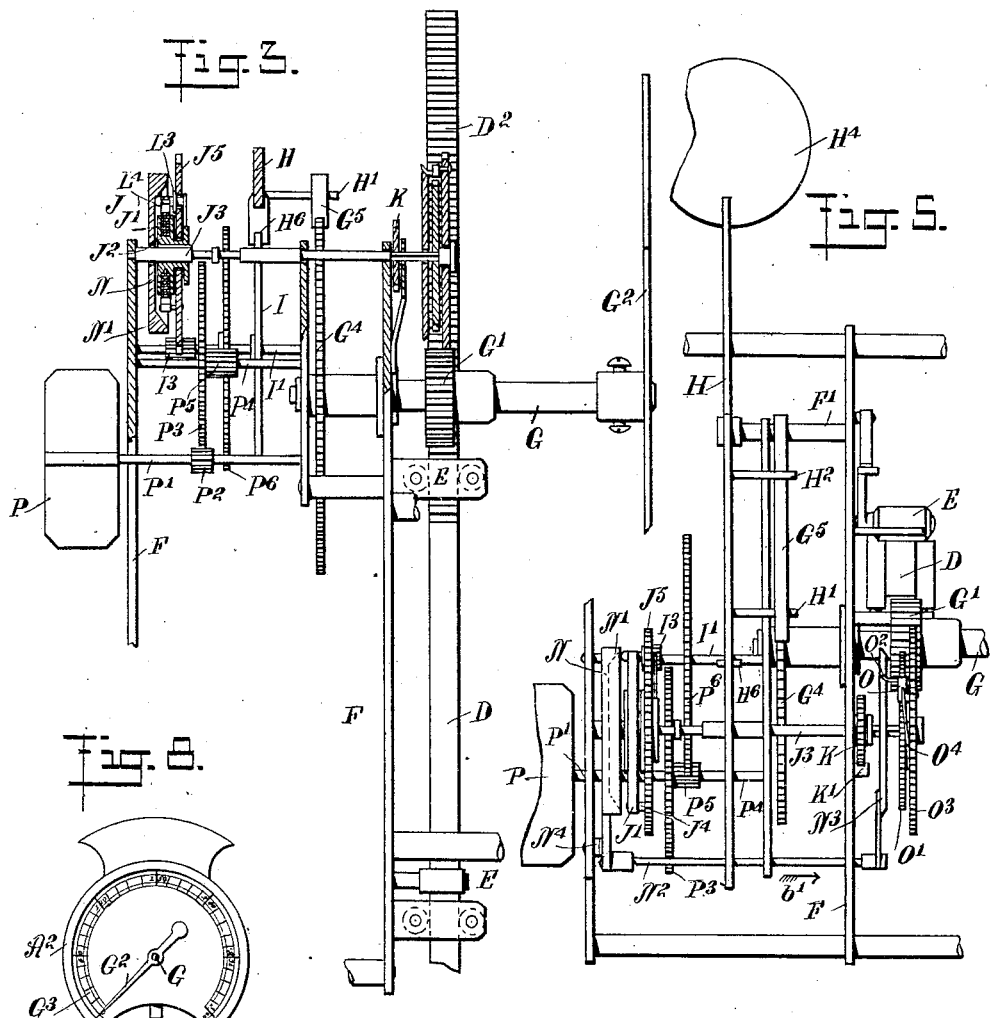
WITNESSES
INVENTOR
James M. Chappel
BY
ATTORNEYS J. M. CHAPPEL.
WEIGHING MACHINE.
APPLICATION FILED JULY 29, 1909.
970,465.
Patented Sept. 20, 1910.
3 SHEETS—SHEET 3.
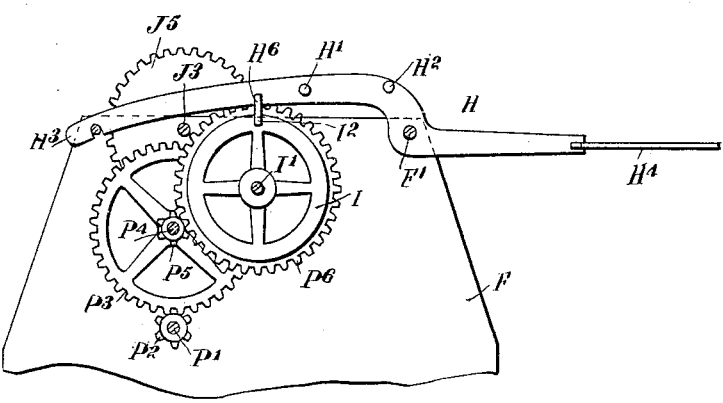
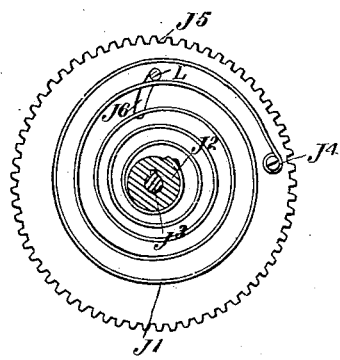
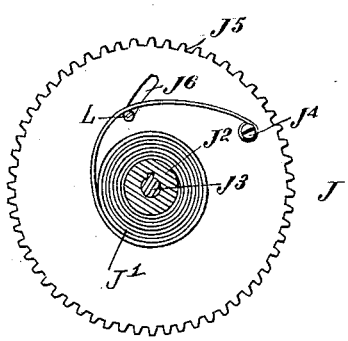
WITNESSES
INVENTOR
James M. Chappel
BY
ATTORNEYS

UNITED STATES PATENT OFFICE.

JAMES M. CHAPPEL, OF NEW YORK, N. Y., ASSIGNOR TO CHARLES S. MARSH, OF WINCHESTER, MASSACHUSETTS.

WEIGHING-MACHINE.

970,465.  Specification of Letters Patent.  Patented Sept. 20, 1910.

Application filed July 29, 1909. Serial No. 510,172.

*To all whom it may concern:*

Be it known that I, JAMES M. CHAPPEL, a citizen of the United States, and a resident of the city of New York, borough of Brooklyn, in the county of Kings and State of New York, have invented a new and Improved Weighing-Machine, of which the following is a full, clear, and exact description.

The invention relates to coin-controlled weighing machines in which the weight of a person or other object standing on the weighing platform is displayed by a pointer on a dial and seen after the introduction of the proper coin.

The object of the invention is to provide a new and improved weighing machine unlimited as to the number of loads put on the weighing platform by the use of a spring actuated mechanism, the spring of which is automatically wound up, and means are provided for preventing overwinding or underwinding of the spring, thus insuring at all times a proper functioning of the machine without requiring any attention.

A further object of the invention is to provide means for allowing the pointer to oscillate without displaying the weight until the proper coin is introduced.

A practical embodiment of the invention is represented in the accompanying drawings forming a part of this specification, in which similar characters of reference indicate corresponding parts in all the views.

Figure 1 is a side elevation of the weighing machine, parts being in section; Fig. 2 is an enlarged face view of the coin-controlled pointer mechanism, the pointer shaft being in section; Fig. 3 is an enlarged cross section of the same, on the line 3—3 of Fig. 2, and showing the mechanism for winding up the spring in inactive position; Fig. 4 is a similar view of the same, and showing the parts in position for winding up the spring; Fig. 5 is a plan view of the same; Fig. 6 is an enlarged face view of the loose gear wheel on the winding-up shaft; Fig. 7 is a face view of the pawl and ratchet mechanism on the winding-up shaft; Fig. 8 is a face view of the dial and pointer in the upper portion of the casing; Fig. 9 is a detail sectional view showing the train of gearing operated by the motor and the coin operated lever with its tooth engaging one of the wheels of the said train; and Figs. 10 and 11 are enlarged face views of the loose gear wheel on the winding up shaft and its spring.

On the hollow base A, of the casing of the machine is mounted a movable scale platform B, adapted to be depressed by the weight of a person or other object standing or placed on the said platform B, the latter being connected with the usual multiplying mechanism located in the base A and including a lever B′ having a knife edge trunnion $B^2$ engaging a hook C′ on the lower end of a rod C carrying at its upper end an anvil $C^2$, the rod extending into the hollow standard A′ erected on the base A, and the rod terminating in a circular casing $A^2$ containing the coin-controlled operating mechanism and a spring motor hereinafter more fully described. The rod C and the anvil $C^2$ are normally held in raised position by a compression spring $C^3$ resting at its lower end on a support $C^4$ affixed to the base A, and at its upper end the spring presses against a collar $C^5$ adjustably secured to the rod C by a set screw $C^6$. By the arrangement described the tension of the spring $C^3$ can be regulated. Now, when a person steps on the platform B, a downward swinging motion is given to the lever B′ which pulls the rod C and its anvil $C^2$ in a downward direction against the tension of the spring $C^3$, the extent of the depression of the platform B and of the rod C and its anvil $C^2$ being dependent on the weight of the person, as is well known in weighing machines of this type. The anvil $C^2$ governs the extent of the movement of a plunger D, mounted to slide up and down in suitable roller guideways E, mounted on a frame F secured within the circular casing $A^2$. The plunger D is provided with an offset D′, adapted to abut against the lower end of the frame F, with a view to limit the upward sliding movement of the plunger D, the downward movement being limited by the anvil $C^2$. The plunger D is provided with a rack $D^2$ in mesh with a pinion G′ secured on the pointed shaft G journaled in the frame F, and on the said pointer shaft G is secured a pointer $G^2$, indicating on a dial $G^3$, held on the front face of the circular casing $A^2$ (see Fig. 8). The plunger D is normally locked in its raised position and for this purpose a mutilated ratchet wheel G⁴ is secured on the pointer shaft G and is engaged by a pawl G⁵ fulcrumed at F' on the frame F.

Coin-controlled mechanism is provided for raising or tripping the pawl G⁵ and thus releasing the ratchet wheel G⁴ and the plunger D to permit the descent of the latter. The coin-controlled mechanism comprises a two-armed lever H fulcrumed at F' on the frame F and provided with a transversely extending pin H' engaging the under side of the pawl G⁵ to lift the latter out of engagement with the ratchet wheel G⁴ at the time the lever H swings in the direction of the arrow a'. A pin H² on the lever H limits the swinging movement of the pawl relative to the lever H, the front end H³ of the latter being weighted so as to normally hold the lever H in lowermost position, as indicated in Fig. 2. The rear end of the lever H is provided with a seat H⁴ extending under a coin chute (not shown) so that a coin H⁵ dropping down the said chute encounters the seat H⁴, to swing the lever H in the direction of the arrow a', thus imparting an upward swinging movement to the pawl G⁵ for the latter to release the ratchet wheel G⁴ and the plunger D as before mentioned.

Time mechanism is provided for holding the lever H and pawl G⁵ in the raised position above described for a predetermined period, preferably about three seconds, to afford sufficient time for the depression of the scale platform B and the actuation of the pointer G², to indicate the weight of the person on the dial G³ previous to the plunger being again arrested by the pawl G⁵ and the intermediate mechanism consisting of the ratchet wheel G⁴, pinion G' and rack D' of the plunger D.

The time mechanism above referred to consists of a motor-driven wheel I secured on a shaft I' journaled in the frame F, and the said wheel I is provided in its peripheral face with a notch I² adapted to be engaged by a tooth H⁶ depending from the front arm H³ of the lever H. Now, when the lever H is in the normal position shown in Fig. 1, then the tooth H⁶ engages the notch I² thus holding the wheel I against rotation, and when the lever H is caused to swing in the direction of the arrow a' by the weight of a coin H⁵ upon the seat H⁴, as previously explained, then the tooth H⁶ is lifted out of the notch I² and the wheel I is thus unlocked and is now rotated by the action of a motor J. Immediately after the wheel I rotates, its notch I² is carried out of alinement with the tooth H⁶, and when the lever H is relieved of the coin H⁵ and swings back in the inverse direction of the arrow a' by the action of its weighted arm H³, then the tooth H⁶ rides on the peripheral face of the wheel I until the latter has made one complete revolution. When this takes place, the notch I² moves into alinement with the tooth H⁶ and the latter drops into the notch I², thus locking the wheel I against rotation until the lever H is again actuated by a coin H⁵, as above described.

The motor J is preferably of the spring-actuated type and consists of a helical spring J', secured at its inner end to the hub of a flanged collar J², keyed or otherwise secured to a winding-up shaft J³, journaled in suitable bearings in the frame F. The outer end of the spring J' is secured to a pin J⁴ attached to a gear wheel J⁵ in mesh with a pinion I³ secured on the shaft I' carrying the notched wheel I. The winding-up shaft J³ is held against return movement by a ratchet wheel K and dog K'. When the spring J' is wound up and the notched wheel I is unlocked by the lever H, as previously explained, then the gear wheel J⁵ is rotated by the force of the wound-up spring J' and the rotary motion of the gear wheel J⁵ is transmitted by the pinion I³ and shaft I' to the notched wheel I to rotate the latter until the notched wheel has made one revolution and is then arrested by the tooth H⁶ of the lever H.

In order to render the machine unlimited as to the number of loads put on the scale platform B, the spring J' of the motor J is automatically wound up and provision is made to prevent overwinding and underwinding of the spring. For the purpose mentioned the following arrangement is made: A stud L extends between the outer and the next following convolution of the spring J' of the motor J, and the said stud L extends through a segmental slot J⁶ formed in the gear wheel J⁵ (see Fig. 6). The stud L is secured to an arm L' fulcrumed at L² on the front face of the gear wheel J⁵. The stud L is provided with a collar L³ journaled on the rear face of the gear wheel J⁵ to hold the stud against transverse movement, but to allow the stud to travel in the segmental slot J⁶. The rear free end L⁴ of the stud L is rounded off and abuts against the beveled cam face N' of a circular cam N secured to a rod N² mounted to slide transversely in suitable bearings on the frame F and on the said rod N² is secured a circular cam N³ controlling a pawl O for a ratchet wheel O' secured on the winding-up shaft J³, which latter extends centrally and loosely through the cams N and N³. The pawl O is provided with an angular pin O² extending onto the beveled peripheral face of the cam N³, and the said pawl O is fulcrumed on a gear wheel O³ held loosely on the winding-up shaft J³ and in mesh with the pinion G' on the pointer shaft G. The pawl O is pressed on by a spring O⁴ to hold the pawl in engagement with the deep-cut teeth of the ratchet wheel O' (see Fig. 7) at the time the cam $N^3$ is in the position shown in Fig. 5, so that a rotary motion given to the pinion $G'$ by the plunger D during an upward movement thereof, is transmitted by the gear wheel $O^3$, pawl O and ratchet wheel $O'$ to the winding-up shaft $J^3$ to wind up the spring J. When the cam-carrying rod $N^2$ is shifted forwardly in the direction of the arrow $b'$ (see Figs. 4 and 5), then the cam $N^3$ acts on the pin $O^2$ and lifts the pawl O out of engagement with the teeth of the ratchet wheel $O'$, so that a rotary motion given to the gear wheel $O^3$ from the pinion $G'$ of the pointer shaft G does not cause a turning of the winding-up shaft $J^3$. Now, this motion given to the cam $N^3$ in the direction of the arrow $b'$ takes place at the time the motor spring $J'$ is wound up to a desired extent, but when the spring has run down to a certain extent, then a reverse shifting of the cam $N^3$ takes place to allow the pawl O to swing back into engagement with the teeth of the ratchet wheel $O'$, as indicated in Fig. 7. The cam N is pressed on by a spring $N^4$ to shift the said cam N, the rod $N^2$ and the cam $N^3$ in the direction of the arrow $b'$ at the time the stud $L^4$ is at the inner end of the beveled face $N'$ of the cam N, as indicated in Fig. 3. When the spring $J'$ unwinds, its second outer convolution exerts a pressure against the stud L to move the latter outwardly (see Fig. 9), the stud now traveling up the beveled face $N'$ of the cam N, thus moving the latter in the inverse direction of the arrow $b'$ and against the tension of the spring $N^4$, and when the cam N is thus shifted rearwardly, the cam $N^3$ is carried along in the same direction. Now, when the stud L reaches the outer end of the beveled cam face $L'$ (see Fig. 4), the spring J has unwound to a desired extent and the cams N, $N^3$ have now been shifted to their extreme rearmost position, and the cam $N^3$ allows the pawl O to swing into engagement with the teeth of the ratchet wheel $O'$, so that on the next rotation of the gear wheel $O^3$ the pawl O is carried along and the ratchet wheel $O'$ and the winding-up shaft are turned to wind up the spring $J'$. During the winding up of the spring $J'$ the outermost convolution presses the stud L in an inward direction, so that the rounded off end $L^4$ of the stud L travels inward on the beveled face $N'$ of the cam N now pressed forward in the direction of the arrow $b'$ by the spring $N^4$ as before explained. When the stud L reaches the innermost end of the beveled face $N'$ of the cam N, the latter and the cam $N^3$ are in the position shown in Fig. 3, with the pawl O thrown out of engagement with the ratchet wheel $O'$. Thus, from the foregoing it will be seen that the motor spring $J'$ is automatically wound up and the said spring governs the extent of its winding up and its unwinding, and overwinding and underwinding of the spring $J'$ is prevented.

The ratchet wheel $G^4$ has a portion of its teeth cut out to form a smooth portion $G^7$, for the pawl $G^5$ to ride on in case parties attempt to operate the machine by jumping on the platform B and moving it abruptly without inserting a coin, it being understood that when the plunger D is pushed up to its fullest extent, the ratchet wheel $G^4$ is turned to bring the last tooth adjacent to the free end of the pawl $G^5$, and when a party jumps on the platform B without inserting a coin, then the plunger only drops a short distance—that is, until the ratchet wheel $G^4$ has turned for the free end of the pawl $G^5$ to reach the other end of the smooth portion of the ratchet wheel $G^4$, the pawl now engaging the first tooth of the ratchet wheel $G^4$, as shown in Fig. 2. The pointer $G^2$ now stands at zero on the dial $G^3$, and when the plunger is raised to its full extent—that is, until the offset $D'$ strikes the frame F—then the pointer $G^2$ swings only over the non-graduated space of the dial.

In order to insure a uniform running of the motor J, a governor is provided in the form of a wind wheel P, secured on a shaft $P'$ journaled in the frame F, and on the said shaft $P'$ is secured a pinion $P^2$ in mesh with a gear wheel $P^3$ secured on a shaft $P^4$ journaled on the frame F and carrying a pinion $P^5$ in mesh with a gear wheel $P^6$ secured on the shaft $I'$ carrying the notched wheel I.

The operation is as follows: When the several parts are in the normal position shown in Figs. 1, 2 and 3, then the spring $J'$ of the motor J is wound up to the desired extent, the wheel I is held against rotation by the lever H, and the pawl $G^5$ is in engagement with the ratchet wheel $G^4$, thus retaining the plunger D in its normal raised position into which the plunger was moved by the anvil $C^2$ on the action of the spring $C^3$ after release of the platform B by a previous load. Now, when a person steps onto the platform B, the anvil $C^2$ is moved downward a distance proportionate to the weight of the person on the platform B, and when the person now inserts the proper coin $H^5$ then the latter swings the lever H in the direction of the arrow $a'$, whereby the lever H lifts the pawl $G^5$ out of engagement with the ratchet wheel $G^4$ to release the plunger D and at the same time the lever H disengages the tooth $H^6$ from the notch $I^2$ in the wheel I. The latter is now rotated by the action of the motor J, and the released plunger D drops until it strikes and comes to rest on the anvil $C^2$. The downward movement of the plunger D causes a rotation of the pinion $G'$ and pointer shaft G, whereby the pointer $G^2$ is turned to indicate the weight of the person on the graduation $G^3$. As soon as the coin $H^5$ drops off the seat $H^4$, then the lever H swings back and the tooth H⁶ now rides on the peripheral face of the wheel I until it finally drops into the notch I² and arrests the turning motion of the wheel I, the latter having now made one complete revolution. When the person steps off the platform, the plunger D is raised to the normal position by the action of the spring C³ lifting the rod C and the anvil C², as before explained.

It is understood that the motor J is active only at the time for giving one turn to the wheel I, and as soon as the motion of the wheel I is arrested, the motor J stops. Now, on about ten or fifteen repetitions of the above described operation, the spring J' has run down to a predetermined extent, and when this takes place the motor parts are in the position shown in Figs. 4 and 5; that is, the cam mechanism has shifted rearwardly so that the pawl O is moved into engagement with the ratchet wheel O', and when the plunger D is next moved upward by the action of the spring C³, then the winding-up shaft J³ is turned to wind up the spring J'. The spring J' is only wound up to its full extent through repeated lifting of the plunger D after successive weighing operations, and when the spring has been wound to its full extent, then the cams N, N³ are returned to the position shown in Fig. 3, thereby lifting the pawl O out of engagement with its ratchet wheel O'.

The guideways E for the plunger to slide in are preferably made of sets of rollers journaled on the frame F to reduce friction of the up and down moving plunger to a minimum. The plunger D is pressed on by a roller E' at the side opposite the rack D² and at a point directly opposite the point of contact of the pinion G' and the rack D², to hold the rack at all times in proper mesh with the pinion G' (see Fig. 1). The roller E' is journaled on the free end of an arm E² fulcrumed on the frame F and pressed on by a spring E³.

Having thus described my invention, I claim as new and desire to secure by Letters Patent:

1. In a coin controlled apparatus, a coin-controlled device, a motor for limiting the time within which the coin-controlled mechanism is inactive after the introduction of the coin, and automatic means for restoring lost energy of the motor.

2. In a coin controlled apparatus, a coin-controlled device, a spring-actuated mechanism for limiting the time within which the coin-controlled mechanism is inactive after the introduction of the coin, and automatic means for rewinding the spring of the said spring-actuated mechanism.

3. In a coin controlled apparatus, a coin-controlled device, a spring-actuated mechanism for limiting the time within which the coin-controlled mechanism is inactive after the introduction of the coin, and automatic means for rewinding the spring of the said spring-actuated mechanism, the said automatic means having devices to prevent overwinding and underwinding of the said spring.

4. In a coin controlled apparatus, a shaft, a vertically movable operating member geared with the said shaft, means for normally locking the shaft and its operating member, coin-actuated means for releasing the said shaft and permitting its forward rotation by the said member, a motor for limiting the time within which the said coin-actuated means are inactive after the introduction of the coin, and automatic means for restoring lost energy of the said motor.

5. In a coin controlled apparatus, a shaft, a vertically movable operating member geared with the said shaft, means for normally locking the shaft and its operating member, coin-actuated means for releasing the said shaft and permitting its forward rotation by the said member, a spring actuated mechanism for limiting the time within which the said coin-actuated means are inactive after the introduction of the coin, and automatic means for rewinding the spring of the said spring-actuated mechanism.

6. In a coin controlled apparatus, a shaft, a vertically movable operating member geared with the said shaft, means for normally locking the shaft and its operating member, coin-controlled means for releasing the said shaft and permitting its forward rotation by the said member, a spring-actuated mechanism for limiting the time within which the said coin-controlled means are inactive after the introduction of the coin, and a connection between the said shaft and the said spring-actuated means for automatically rewinding the spring thereof.

7. In a coin controlled apparatus, a shaft, a vertically movable operating member geared with the said shaft, means for normally locking the shaft and its operating member, coin-actuated means for releasing the said shaft and permitting its forward rotation by the said member, a spring-actuated mechanism for limiting the time within which the said coin-actuated means are inactive after the introduction of the coin, the said spring-actuated mechanism comprising a winding-up shaft, a wheel loose on the said shaft and connected with a member of the said coin-actuated means, a spring having one end secured to the said winding-up shaft and the other end to the said wheel, a gear wheel loose on the said winding-up shaft and geared with the said shaft, and a pawl and ratchet mechanism connecting the said gear wheel with the said winding-up shaft.

8. In a coin controlled apparatus, a shaft, a vertically movable operating member geared with the said shaft, means for normally locking the shaft and its operating member, coin-actuated means for releasing the said shaft and permitting its forward rotation by the said member, a spring-actuated mechanism for limiting the time within which the said coin-actuated means are inactive after the introduction of the coin, the said spring-actuated mechanism comprising a winding-up shaft, a wheel loose on the said shaft and connected with a member of the said coin-actuated means, a spring having one end secured to the said winding-up shaft and the other end to the said wheel, a gear wheel loose on the said winding-up shaft and geared with the said shaft, a pawl and ratchet mechanism connecting the said gear wheel with the said winding-up shaft, and automatic means controlled by the said wheel and spring for throwing the said pawl and ratchet mechanism into and out of action to prevent overwinding and underwinding of the said spring.

9. In a coin controlled apparatus, a shaft, a vertically movable operating member geared with the said shaft, means for normally locking the shaft and its operating member, coin-actuated means for releasing the said shaft and permitting its forward rotation by the said member, a spring-actuated mechanism for limiting the time within which the said coin-actuated means are inactive after the introduction of the coin, the said spring-actuated mechanism comprising a winding-up shaft, a wheel loose on the said shaft and connected with a member of the said coin-actuated means, a spring having one end secured to the said winding-up shaft and the other end to the said wheel, a gear wheel loose on the said winding-up shaft and geared with the said shaft, a pawl and ratchet mechanism connecting the said gear wheel with the said winding-up shaft, a cam for throwing the pawl of the said pawl and ratchet mechanism into and out of engagement with its ratchet wheel, a shifting rod carrying the said cam and movable in the direction of its length, a second cam on the said shifting rod, and a pin carried by the said wheel and engaging the said second cam.

10. In a coin controlled apparatus, a shaft, a vertically movable operating member geared with the said shaft, means for normally locking the shaft and its operating member, coin-actuated means for releasing the said shaft and permitting its forward rotation by the said member, a spring-actuated mechanism for limiting the time within which the said coin-actuated means are inactive after the introduction of the coin, the said spring-actuated mechanism comprising a winding-up shaft, a wheel loose on the said shaft and connected with a member of the said coin-actuated means, a spring having one end secured to the said winding-up shaft and the other end to the said wheel, a gear wheel loose on the said winding-up shaft and geared with the said shaft, a pawl and ratchet mechanism connecting the said gear wheel with the said winding-up shaft, a cam for throwing the pawl of the said pawl and ratchet mechanism into and out of engagement with its ratchet wheel, a shifting rod carrying the said cam and movable in the direction of its length, a second cam on the said shifting rod, and a pin carried by the said wheel and engaging the said second cam, the said pin extending between successive convolutions of the said spring.

11. In a coin controlled apparatus, a shaft, a vertically movable operating member geared with the said shaft, means for normally locking the shaft and its operating member, coin-actuated means for releasing the said shaft and permitting its forward rotation by the said member, a spring-actuated mechanism for limiting the time within which the said coin-actuated means are inactive after the introduction of the coin, the said spring-actuated mechanism comprising a winding-up shaft, a wheel loose on the said shaft and connected with a member of the said coin-actuated means, a spring having one end secured to the said winding-up shaft and the other end to the said wheel, a gear wheel loose on the said winding-up shaft and geared with the said shaft, a pawl and ratchet mechanism connecting the said gear wheel with the said winding-up shaft, a cam for throwing the pawl of the said pawl and ratchet mechanism into and out of engagement with its ratchet wheel, a shifting rod carrying the said cam and movable in the direction of its length, a second cam on the said shifting rod, an arm fulcrumed on the said wheel, and a pin carried on the free end of the said arm and in engagement with the said second cam, the pin passing between successive convolutions of the said spring.

12. In a coin controlled apparatus, a shaft, a coin-controlled device for rendering the said shaft operative on the introduction of a coin, the said coin-controlled device having a notched wheel and a lever provided with a tooth adapted to ride on the peripheral face of the said notched wheel and to drop into the notch of the wheel, a winding-up shaft, a gear wheel loose on the said winding-up shaft and geared with the said notched wheel, a spring having one end connected with the said winding-up shaft, and the other end with the said gear wheel, a second gear wheel, loose on the said winding-up shaft and geared with the said shaft, a pawl and ratchet mechanism for connecting and disconnecting the said second gear wheel and the said winding-up shaft, and a cam device for throwing the pawl into and out of engagement with its ratchet, said cam device having a pin moving with the said first named gear wheel and controlled by the said spring.

13. In a coin controlled apparatus, a shaft, a coin-controlled device for rendering the said shaft operative on the introduction of a coin, the said coin-controlled device having a notched wheel and a lever provided with a tooth adapted to ride on the peripheral face of the said notched wheel and to drop into the notch of the wheel, a winding-up shaft, a gear wheel loose on the said winding-up shaft and geared with the said notched wheel, a spring having one end connected with the said winding-up shaft and the other end with the said gear wheel, a second gear wheel loose on the said winding-up shaft and geared with the said pointer shaft, a pawl and ratchet mechanism for connecting and disconnecting the said second gear wheel and the said winding-up shaft, a spring-pressed shifting rod having two cams, one for engagement with the pawl of the said pawl and ratchet mechanism, and a pin movably carried by the said first named gear wheel and controlling the other cam, the said pin being controlled by successive convolutions of the said spring.

In testimony whereof I have signed my name to this specification in the presence of two subscribing witnesses.

JAMES M. CHAPPEL.

Witnesses:
 THEO. G. HOSTER,
 PHILIP D. ROLLHAUS.